US008113565B2

(12) United States Patent
Zeuner et al.

(10) Patent No.: US 8,113,565 B2
(45) Date of Patent: Feb. 14, 2012

(54) DEVICE FOR INCREASING CONTAINER VOLUME

(75) Inventors: Maik Zeuner, Bielefeld (DE); Gerhard Theissing, Harsewinkel (DE); Josef Spechtel, Versmold (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1935 days.

(21) Appl. No.: 11/058,590

(22) Filed: Feb. 15, 2005

(65) Prior Publication Data

US 2011/0095554 A1    Apr. 28, 2011

(30) Foreign Application Priority Data

Feb. 16, 2004    (DE) .......................... 10 2004 007 673

(51) Int. Cl.
    *B60P 3/22* (2006.01)
(52) U.S. Cl. ......... 296/32; 296/36; 296/15; 296/100.09; 296/100.1
(58) Field of Classification Search ............. 296/7, 13, 296/14, 32, 36, 100.06, 100.09, 100.1, 15
    See application file for complete search history.

(56) References Cited

U.S. PATENT DOCUMENTS

| 4,466,549 | A |   | 8/1984 | Hanaway |
| 5,151,064 | A | * | 9/1992 | Damman et al. ................ 460/23 |
| 6,692,352 | B2 | * | 2/2004 | Gerber et al. ................ 460/119 |
| 6,752,715 | B2 | * | 6/2004 | Stephens et al. ................ 460/23 |

FOREIGN PATENT DOCUMENTS

| DE |   4120731   | * | 12/1992 |
| DE | 43 20 565 A1 |   | 1/1995 |
| DE | 44 45 933 A1 |   | 6/1996 |
| DE | 100 51 096 NA1 |   | 4/2002 |
| GB |   2296175   | * | 6/1996 |

\* cited by examiner

*Primary Examiner* — Dennis Pedder
(74) *Attorney, Agent, or Firm* — Michael J. Striker

(57) ABSTRACT

The device for increasing volume of a container (24) has extension elements (37, 38, 39, 40) pivotally mounted on an upper edge (31) of an upper opening (32) so as to form a cover at least partially closing the upper opening (32) when the extension elements (37, 38, 39, 40) are in flat closed positions and an enlarging extension (27) for the container when the extension elements are in raised filling positions, neighboring extension elements being pivotally connected with each other, and at least one driving pivoting device (53), which pivots or swings each extension element (37, 38, 39, 40) from its flat closed position into its raised filling position (47, 48, 49, 50) out beyond a vertical position thereof in a direction toward an exterior of the container, or from its raised filling position into its flat closed position.

9 Claims, 3 Drawing Sheets

DEVICE FOR INCREASING CONTAINER VOLUME

CROSS-REFERENCE

The invention claimed and described herein below is also described in German Application 10 2004 007 673.1, filed on Feb. 16, 2004 in Germany. The aforesaid German Patent Application provides the basis for a claim of priority of invention for the invention claimed herein below under 35 U.S.C. 119 (a) to (d).

BACKGROUND OF THE INVENTION

1. Field of the Invention

The present invention relates to a device for increasing the volume or capacity of a container provided with an upper opening having an upper edge, which comprises a plurality of extension elements pivotally mounted on the upper edge of the opening, wherein the extension elements form a cover at least partially closing the opening when lying flat in a closing configuration and form an enlarging extension for the container in an erect filling configuration and neighboring extension elements are pivotally connected with each other.

2. Description of the Related Art

The grain tank of a combine harvester is provided with a grain tank extension, which comprises a plurality of side walls. The side walls are movable from a closed configuration into an opened configuration, and from the opened configuration to the closed configuration. During travel on a road the side walls are folded closed to form a cover to save space so that the combine harvester does not exceed its proscribed total height. In operation on a field the side walls are raised in the opened configuration so that the grain tank volume is increased and the grain tank needs to be emptied less often and at greater time intervals.

DE 100 51 096 A1 discloses a device for increasing container capacity, which comprises four walls, which are movable between an operating configuration, in which they form a laterally closed enclosure, and an out-of-operation configuration. Two walls opposite to each other are made from a rigid material and are pivotable. The other two walls opposite from each other are made from a flexible material and are also pivotable. The walls made from the flexible material are connected at their ends with the walls made of the rigid material, so that in the operating configuration a laterally closed enclosure is formed. The rigid walls are raised by means of a filled pipe, which is automatically raised and lowered with a drive. The flexible walls are raised together with the rigid walls into the operating configuration and folded together again because of their flexibility, when the rigid walls are again folded into the out-of-operation condition. In the operating configuration the rigid walls are folded out past the vertical position, while the flexible trapezoidal walls are oriented vertically when the rigid walls are completely folded out. The disadvantage of this device is that the flexible walls are very strongly stressed or loaded by the lateral pressure of the grain tank contents. The flexible walls are thus not suitable for this sort of use and wear out more than average.

SUMMARY OF THE INVENTION

It is an object of the present invention to provide a device for increasing the volume of a container, which provides the container with additional capacity, is operable in a stable and wear-resistant manner and is completely automatically operable.

This object and others, which will be made more apparent hereinafter, are attained in a device for increasing the volume or capacity of a container provided with an upper opening having an upper edge, which device comprises a plurality of extension elements pivotally mounted on the upper edge of the upper opening so as to form a cover at least partially closing the upper opening when each of the extension elements is in a flat closed position and to form an enlarging extension for the container when each of the extension elements is in a raised filling position, and wherein neighboring extension elements are pivotally connected with each other.

According to the invention the device for increasing the container volume has at least one driving pivoting device, which pivots or swings each extension element from its flat closed position into its raised filling position out beyond a vertical position in a pivoting direction toward an exterior of the container, or from the raised filling position into the flat closed position.

Alternatively the device for increasing the container volume has a first pivot mechanism that swings or pivots at least two opposing extension elements into first angular orientations at respective angles in relation to a vertical position thereof and a second pivot mechanism that swings or pivots two other extension elements out beyond a vertical position thereof into second angular orientations at respective angles in relation to said vertical position thereof.

The container capacity is advantageously increased in the filling or operating configuration since each extension element is pivoted from the flat closed position into an erect filling position beyond a vertical position thereof in a pivoting direction toward the outside of the container.

So that the device is simple and economical the volume-increasing extension comprises at least two one-piece extension elements arranged opposite to each other and at least two multi-piece extension elements arranged opposite to each other.

Especially it has proven to be advantageous when each multi-piece extension element comprises two folding triangular elements and trapezoidal center element. The folding triangular elements are connected pivotally with the trapezoidal center element with at least one hinge device.

In an advantageous embodiment of the device for increasing container volume the center elements of the multi-piece extension elements are pivotally connected to the upper edge of the container opening so that they forms a closing cover for the grain tank together with the one-piece extension elements.

In another embodiment of the device for increasing container volume the folding triangular elements are advantageously pivotable into respective angular relationships with the center elements of the multi-piece extension elements when the extension elements are in the raised filling positions.

Because the extension elements form a kinematic linkage, the extension elements must not be separated from each other during pivoting from the filling or operating configuration into the closed configuration, and from the closed configuration into the operating configuration.

In order to obtain a simple economical construction the pivoting device comprises at least one pivot mechanism with at least one pivot axle. The pivot mechanism pivots respective opposing extension elements jointly.

So that extension elements are pivotable to an obtuse angular position, at least one raising lever is attached to a pivot axle in the pivot mechanism, which is pivotally connected by means of at least one pendulum support with an extension element.

When the pivot axles of the pivot mechanisms are connected with each other by means of at least one coupling rod, the opposing extension elements perform the same or opposing pivot motions.

In further preferred embodiments the pivot axles connected by means of the coupling rod with each other are driven together by means of at least one positioning member.

The positioning members are arranged outside of the container so that they are easily accessible and the position members do not come into contact with the contents of the container.

It is especially economical when the positioning member is a double-acting hydraulic cylinder, since the hydraulic cylinders are marketable in ever increasing large numbers and replacement part storage is reduced.

The double-acting hydraulic cylinders are preferably acted on with the same pressures, so that only one simple hydraulic drive is required without additional control means.

Because the piston rods of the hydraulic cylinders have opposing motion directions during pivoting of the extension elements, the piston rods press with different sized forces with the same pressure applied to the hydraulic cylinders.

So that the extension parts are pivoted as free of jolts and bumps as possible, the piston rods move at the same time and with about the same speed.

So that the device for pivoting is not blocked, at least two extension elements are raised so that they are approximately vertically oriented with a first pivot mechanism. At least two other extension elements are raised together and subsequently and/or at the same time the two other extension elements are pivoted beyond respective vertical orientations in a pivoting direction out into respective second angular positions at second angles by a second pivot mechanism, whereby the first extension elements are pivoted further from their nearly vertical orientations into respective first angular positions at a first angles to vertical.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
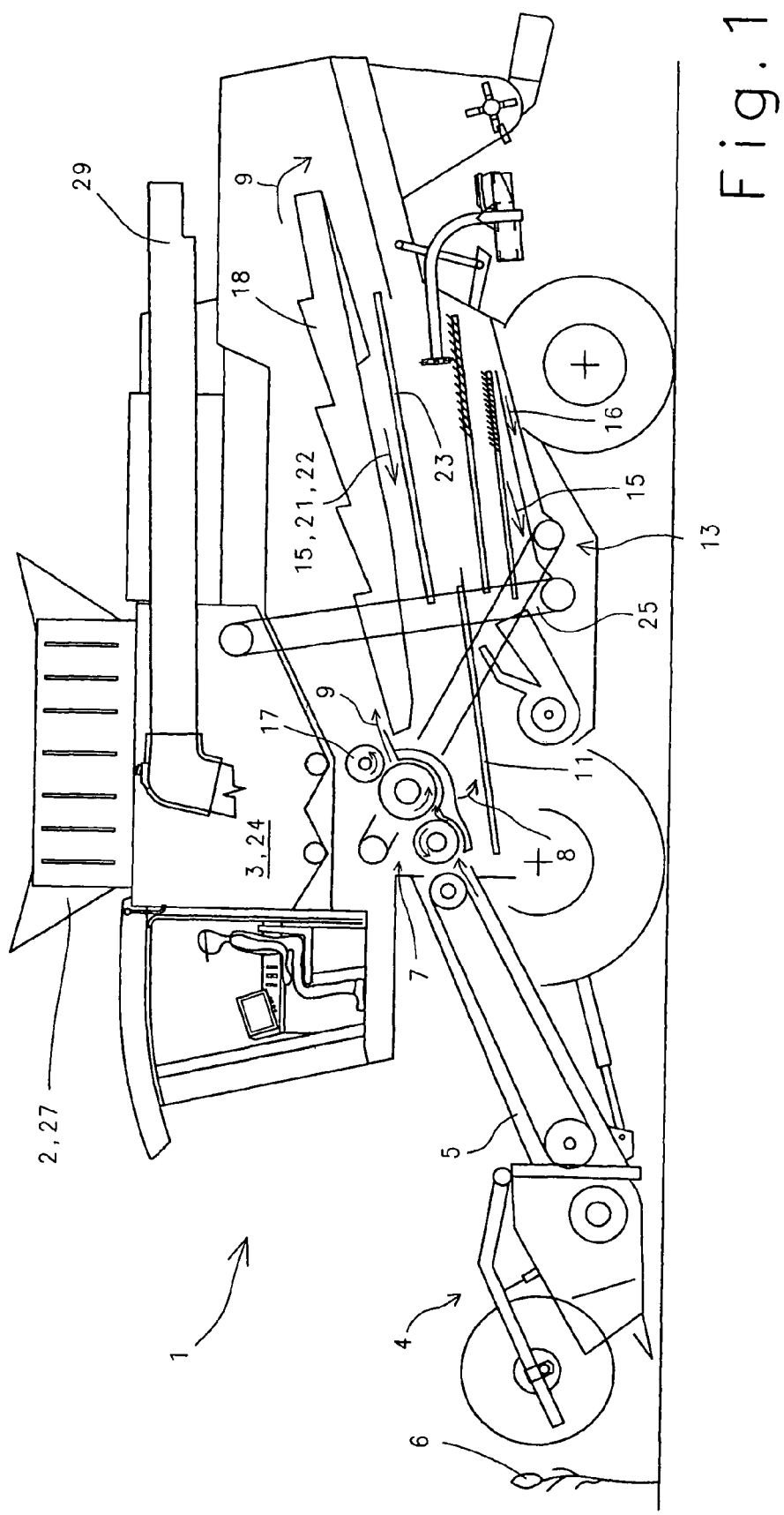
FIG. 1 is a schematic longitudinal cross-sectional view through a combine harvester provided with the device for increasing the volume of a container (its grain tank) according to the invention.

The combine harvester 1 shown in FIG. 1 includes an embodiment of the device 2 for increasing the volume of a grain tank 3. The combine harvester 1 is equipped with a header 4 on its front end, which is arranged on a feed rake 5. The combine harvester 1 takes the crop in with the header 4 and feeds it to the feed rake 5. The feed rake 5 conveys the crop 6 to a following threshing mechanism 7. The threshing mechanism 7 divides the crop 6 into a grain-chaff mixture 8 and a crop stream 9 comprising the stems or stalks. The grain-chaff mixture 8 is immediately fed to a cleaning device 13 by means of a grain pan 11, which separates the grain 15 from the non-grain components 16, i.e. the stalks and chaff components.

A beater 17 rotating counterclockwise is arranged downstream or behind the threshing mechanism 7. The beater 17 feeds the crop steam 9 comprising the threshed stalks to a straw walker rack 18. The straw walker rack 18 separates the grain 15, the short straw 21 and the chaff 22 present in the crop steam 9, which similarly arrives at the cleaning device 13 by means of the return pan 23. A grain elevator 25 feeds the grain 15 separated from the cleaning device 13 into a container 24 of the combine harvester 1, the so-called grain tank 3. The grain 15 in the grain tank 3 is unloaded from the grain tank, as required, to a conveying vehicle (not shown) by means of the grain tank unloading conveyor 29. The device 2 according to the invention for increasing the volume of a grain tank 3 is arranged on the upper end of the grain tank 3 and is in the form of the grain tank extension 27. The grain tank extension 27 is funnel-shaped and increases the volume of the grain tank 3.

Figure 2:
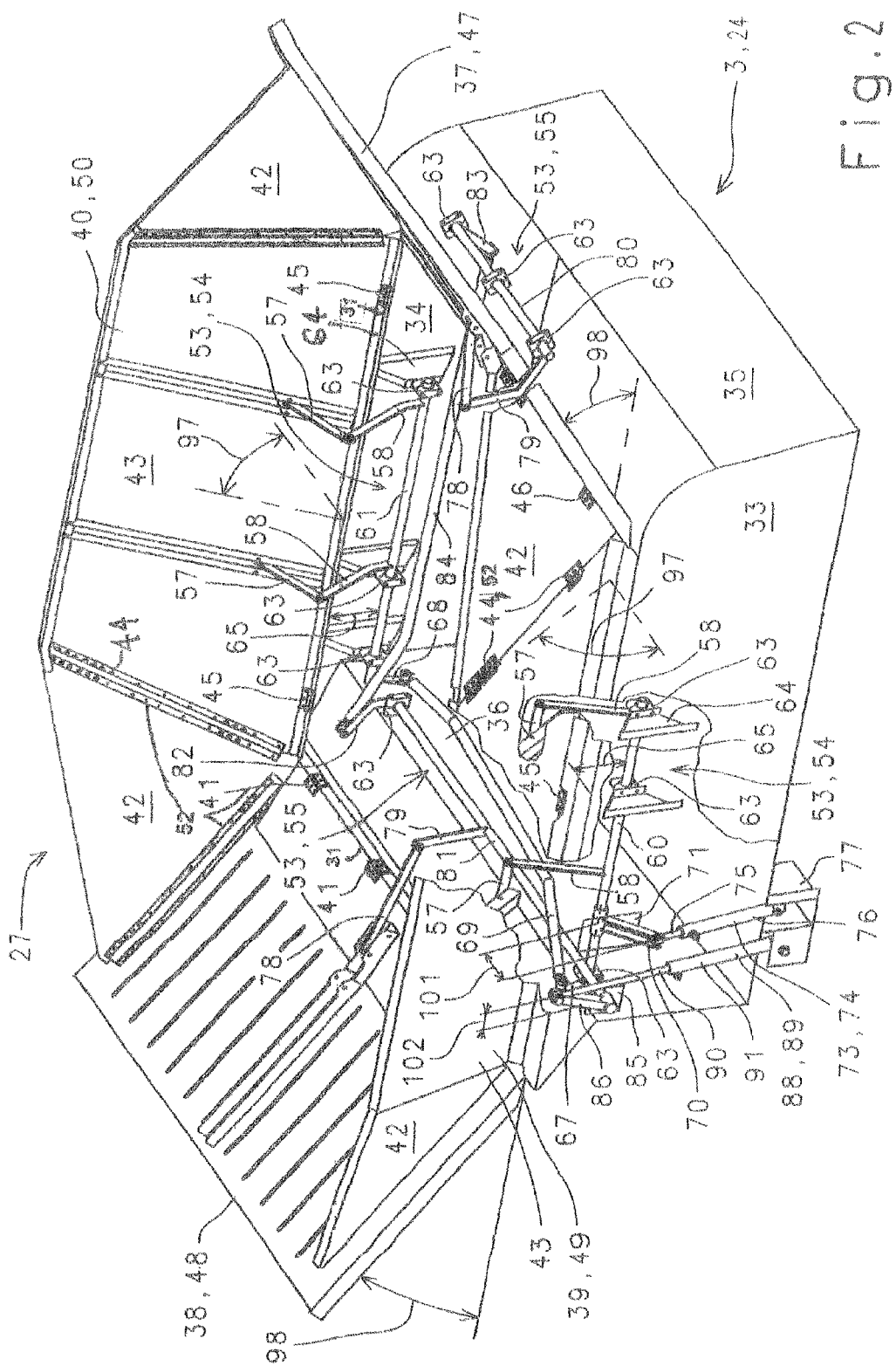
FIG. 2 is a perspective view of the device for increasing container volume according to the invention, embodied as a funnel-shaped container extension.

FIG. 2 is a perspective view of the device 2 for increasing volume of a container 24. The device 2 is arranged on an edge 31 of an upper opening 32 of the rectangular container 24. The edge 31 of the container 24 is formed by the upper edges of two side walls 33, 34 and the upper edges of two side walls 35, 36 of the container 24. The device 2 comprises two opposing one-piece extension element 37, 38 and two opposing multi-piece extension elements 39, 40. Both one-piece extension elements 37, 38 are pivotally mounted on the corresponding upper edges of the side walls 35, 36 by means of hinges 41, which are known. The two opposing multi-piece extension elements 39, 40 each comprise two equal member folding triangular elements 42 and a trapezoidal center element 43 arranged between them. The folding triangular elements 42 are connected pivotally with the center element 43 by means of hinges 44. The center elements 43 are mounted pivotally by means of hinges 45 on the upper edges of the side walls 33, 34. The outer edges of the folding triangular elements 42 are similarly pivotally connected by means of hinges 46 with the one-piece extension elements 37, 38 and are oriented at an angle to them. The extension elements 37, 38, 39, 40 are shown in the filling or operating positions 47, 48, 49 50 in FIG. 2 and together form a funnel-shaped extension 27. The pivotal connections formed by hinges 41, 44, 45, 46 between the one-piece extension elements 37, 38 and the multi-piece extension elements 39, 40 and between the trapezoidal center element 43 and the folding triangular elements 42 of the multi-piece extension elements 39, 40 make a kinematic linkage 52, which is foldable with the help of a still-to-be-described pivoting device 53. The extension elements 37, 38, 39, 40 are jointly pivotable by means of the pivoting device 53 from the horizontal closed positions, in which they form a cover closing the opening 32 of the container 24 beyond their vertical positions in a pivoting direction toward the container exterior into the raised filling positions 47, 48, 49, 50, and from the filling positions back into the closed positions.

The pivoting device 53 comprises two pivot mechanisms 54, 55. The first pivot mechanism 54 is associated with the two opposing multi-piece extension elements 39, 40 and the second pivot mechanism 55 is associated with the two opposite one-piece extension elements 37, 38. The first pivot mechanism 54 for the opposing multi-piece extension elements 39, 40 comprises the following elements.

Two pendulum supports 57 are pivotally connected at one end to each center element 43 of both multi-piece extension element 39, 40. At their other ends the pendulum supports 57 are connected to raising levers 58. The raising levers 58 are welded to axles 60, 61 running parallel to the upper edges of the side walls 33, 34, which are pivotally mounted in stationary bearings 63 on the inner sides of the side walls 33, 34. The stationary bearings 63 are attached to the side walls 33, 34 by means of the brackets 64. The axles 60, 61 are spaced with a spacing 65 from the upper edges of the side walls 33, 34. Respective rocker arms 67, 68 are welded on the ends of corresponding axles 60, 61 which are closest to side wall 36. The axles 60, 61 are coupled with each other by a coupling rod 69, which is pivotally connected with the rocker arms 67, 68. A connecting lever 70, which protrudes from the container 24 through an opening 71 in the side wall 33, is welded to the axle 60. The end of the lever 70 protruding from the container 24 is pivotally connected with a positioning member 74 embodied as a double acting hydraulic cylinder 73. The piston rod 75 of the hydraulic cylinder 73 is articulated with the connecting lever 70 and the cylinder tube 76 of the hydraulic cylinder 73 is pivotally mounted by a bracket 77 on the outer side of the container 24.

The second pivot mechanism 55 for the opposing one-piece extension elements 37, 38 is constructed in a similar manner and comprises the following elements.

Respective pendulum supports 78 are engaged at their one ends with corresponding one-piece extension elements 37, 38 and are pivotally connected at their other ends with corresponding raising levers 79. The raising levers 79 are welded to axles 80, 81 extending parallel to the upper edges of the side walls 35, 36, which are pivotally mounted in stationary bearings 63 on the inner sides of the side walls 35, 36. The stationary bearings 63 are attached to the side walls 35, 36, so that the axles 80, 81 are at the same height as the axles 60, 61. Respective rocker arms 82, 83 are welded on ends of the corresponding axles 80, 81, which are closest to side wall 34. The axles 80, 81 are coupled with each other by a coupling rod 84, which is pivotally connected with the rocker arms 82, 83. A connecting lever 86 is welded on an end of the pivot axle 81, which protrudes through an opening 85 in the side wall 83. The connecting lever 86 is pivotally connected with a second positioning member or device 89 embodied or constructed as a double-acting hydraulic cylinder 88. The piston rod 90 of the hydraulic cylinder 88 is pivotally connected with the connecting lever 86 and the cylinder tube 91 of the hydraulic cylinder 88 is pivotally attached by means of a bracket 77 to the outer side of the container 24.

In order to raise the extensions elements 37, 38, 39, 40 out from the horizontal closed positions, the positioning member 89 constructed as a double-acting hydraulic cylinder 88 associated with them is pressurized via its piston end. The piston rod 90 of the positioning member 89 extends or travels out, whereby the pivot axle 81 associated with the one-piece extension element 38, rotates counterclockwise. Because of that the coupling rod 84 attached between the pivot axles 80, 81 moves in a direction away from the facing wall 35 and causes a clockwise rotation of the pivot axle 80 associated with the extension element 37. The raising levers 79 attached to the pivot axles 80, 81 swing upward and raise the extension elements 37, 38 so that they are approximately vertical with the help of the raised pendulum supports 78. The folding triangular elements 42 pivotally connected with the one-piece extension elements 37, 38 are thereby raised, whereby the center elements 43 of the extension elements 39, 40 are raised along with them. At the same time as pressure acts on the hydraulic cylinder 88, the positioning member 74 embodied as a double-acting hydraulic cylinder 73 is acted on with pressure at its piston rod end, so that its piston rod 75 is moves into the cylinder tube 76 and the pivot axle 60 associated with the extension element 39 rotates in the counterclockwise direction. Because of that the coupling rod 69 fixed between the pivot axles 60, 61 moves in a direction away from the side wall 34 and causes a clockwise rotation of the pivot axle 61. The raising levers 58 attached to the pivot axles 60, 61 pivot upward and move the extension elements 39, 40 beyond their vertical positions in a pivot direction toward the exterior and reach second angles 97 in their raised filling positions 49, 50. The one-piece extension elements 37, 38 are raised with the help of the folding triangular elements 42 past their approximately vertical positions in a pivot direction toward the exterior and reach first angles 98 in their raised filling positions 47, 48.

In order to pivot the extension elements 37, 38, 39, 40 back from the filling positions into the horizontal closed positions, the hydraulic cylinder 73 is acted on with pressure at the piston end so that the piston rod 75 travels out from the cylinder tube 76 of the hydraulic cylinder 73 and the hydraulic cylinder 88 is acted on with pressure at the piston rod end so that the extended piston rod 90 of the hydraulic cylinder 88 is moved back simultaneously into the cylinder tube 91.

So that hydraulic cylinders 73, 88 can be constructed structurally equal with the connecting levers 70, 86 of equal length and the first and second angles 97, 98 are equal. Both hydraulic cylinders 73, 88 are acted on with the same pressure. Because of these structural features the piston rods 75, 90 press with a greater force when they travel out than when they travel in. The return displacements of both piston rods 75, 90 are approximately equal so that both piston rods 75, 90 travel in and out with approximately equal speeds.

Since the extension 27 forms a kinematic linkage 52, the motion of the pivot mechanisms 54, 55 must be controlled so that the extension elements 37, 38, 39, 40 do not hinder each other, but instead assist each other, during pivoting.

The different piston forces of the hydraulic cylinders 73, 88 during extension and retraction of the piston rods 75, 90 and the continuously changing spacing 101, 102 between the piston rods 75, 90 and the pivot axles 60, 81 determine the torques acting on the axles 60, 61, 80, 81 of the pivot mechanisms 54, 55, which are applied for pivoting the extension elements 37, 38, 39, 40.

During pivoting of the multi-piece extension elements 39, 40 from the filling positions 49, 50 inclined to the outside into the horizontal closed positions high torques are required at the axles 60, 61 of the pivot mechanism 54 for folding in of the extension elements 39, 40 at the start of the folding operation, in order to overcome the weight acting on the extension elements, which are inclined toward the exterior. At the same time the extension elements 37, 38 are pivoted by means of the extending piston rod 88, which has only a minimum spacing 102 to the pivot axle 81, with a minimal torque acting on the pivot mechanism 55. During the pivoting the spacing 101 decreases while the spacing 102 increases, whereby the torque acting on the pivot mechanism 54 for the multi-piece extension elements 39, 40 decreases, and at the same time the torque acting on the pivot mechanism 55 of the one-piece extension element 37, 38 increases.

Figure 3:
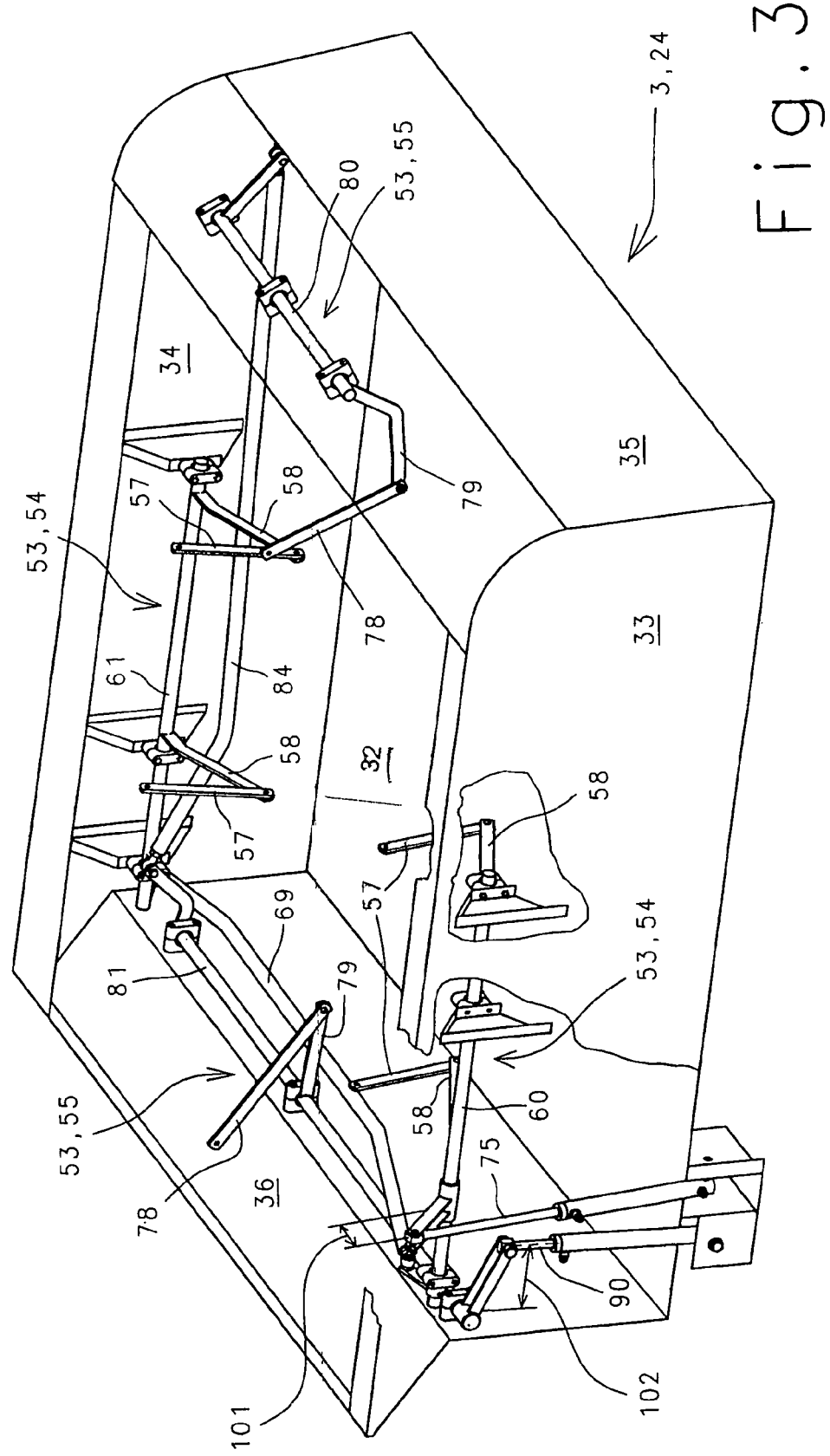
FIG. 3 is another perspective view of the device for increasing container volume, showing the pivoting device for pivoting the extension elements.

FIG. 3 is a perspective view of the pivoting device 53 according to the invention in a configuration in which the extension elements 37, 38, 39, 40 (not shown) are pivoted into horizontal closed positions. To pivot the extension elements 37, 38 from the horizontal closed positions into the filling positions 47, 48 at the start of the pivoting motion high torques are required on the axles 80, 81 to raise the extension elements 37, 38, in order to overcome the weight acting on the extension elements 37, 38. The extending piston rod 90 presses with higher force and has a maximum perpendicular spacing 102 to the pivot axle 81, so that a maximal torque acts on the pivot mechanism 55. At the same time the extension elements 39, 40 are pivoted with a minimal torque acting on the pivot mechanism 54 by means of a retracting piston rod 75, which presses with lesser force and has a minimal perpendicular spacing 101 to the pivot axle 60. As the pivoting of the extension elements 39, 40 continues the spacing 101 between the rotation axis 60 and the hydraulic cylinder 73 decreases and the spacing 102 between the rotation axle 81 and the hydraulic cylinder 88 increases, whereby the minimal torque acting by means of the pivot mechanism 54 on the multi-piece extension elements 39, 40 increases and at the same time the maximal torque acting on the pivot mechanism 55 of the one-piece extension elements 37, 38 decreases.

Additional embodiments of the device according to the invention are conceivable in which an electric spindle drive is used as positioning member instead of a hydraulic cylinder.

Other embodiments of the device according to the invention could use a geared motor as positioning member at the end of the axles 60, 61, 80, 81.

PARTS LIST

| | |
|---|---|
| 1 | Combine harvester |
| 2 | Device for container volume increase |
| 3 | Grain tank |
| 4 | Header |
| 5 | Feed rake |
| 6 | Crop |
| 7 | Threshing mechanism |
| 8 | Grain-chaff mixture |
| 9 | Crop stream |
| 11 | Grain pan |
| 13 | Cleaning device |
| 15 | Grain |
| 16 | Non-grain components |
| 17 | Beater |
| 18 | Straw walker rack |
| 21 | Short straw |
| 22 | Chaff |
| 23 | Return pan |
| 24 | Container |
| 25 | Grain elevator |
| 27 | Extension |
| 29 | Grain tank unloading conveyor |
| 31 | Upper edge |
| 32 | Container opening |
| 33 | Side wall |
| 34 | Side wall |
| 35 | Side wall |
| 36 | Side wall |
| 37 | Extension element |
| 38 | Extension element |
| 39 | Extension element |
| 40 | Extension element |
| 41 | Hinge |
| 42 | Folding triangular element |
| 43 | Center element |
| 44 | Hinge |
| 45 | Hinge |
| 46 | Hinge |
| 47 | Filling position |
| 48 | Filling position |
| 49 | Filling position |
| 50 | Filling position |
| 52 | Kinematic linkage |
| 53 | Pivoting device |
| 54 | 2$^{nd}$ pivot mechanism |
| 55 | 1$^{st}$ pivot mechanism |
| 57 | Pendulum support |
| 58 | Raising lever |
| 60 | Pivot axle |
| 61 | Pivot axle |
| 63 | Bearing |
| 64 | Bracket |
| 65 | Spacing |
| 67 | Rocker arm |
| 68 | Rocker arm |
| 69 | Coupling rod |
| 70 | Connecting lever |
| 71 | Opening |
| 73 | Hydraulic cylinder |
| 74 | Positioning member |
| 75 | Piston rod |
| 76 | Cylinder tube |
| 78 | pendulum support |
| 79 | raising lever |
| 80 | pivot axle |
| 81 | pivot axle |
| 82 | rocker arm |
| 83 | rocker arm |
| 84 | coupling rod |
| 86 | connecting lever |
| 88 | hydraulic cylinder |
| 89 | positioning member |
| 90 | piston rod |
| 91 | cylinder tube |
| 97 | opening angle |
| 98 | opening angle |
| 101 | spacing |
| 102 | spacing |

The disclosure in German Patent Application 10 2004 007 673.1 of Feb. 16, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a device for increasing container volume or capacity, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A device for increasing a volume or capacity of a container, said container (24) being provided with an upper opening (32) having an upper edge (31), wherein said device comprises a plurality of extension elements (37, 38, 39, 40) pivotally mounted on the upper edge (31) of the upper opening (32) so as to form a cover at least partially closing the upper opening (32) when each of the extension elements (37, 38, 39, 40) is in a flat closed position and an enlarging extension (27) for the container when each of the extension elements is in a raised filling position, and wherein neighboring ones of said extension elements are pivotally connected with each other, said enlarging extension (27) comprising at least two opposing one-piece elements (37, 38) and at least two opposing multi-piece elements (39, 40), said multi-piece elements (39, 40) each comprising two folding triangular elements (42) and a trapezoidal-shaped center element (43) arranged between the triangular elements (42), and wherein the folding triangular elements (42) are pivotally connected with the center element (43) by respective hinges (44); and at least one driving pivoting device, which pivots or swings each of said extension elements (37, 38, 39, 40) from said flat closed position into said raised filling position (47, 48, 49, 50) out beyond a vertical position thereof in a pivoting direction toward an exterior of the container, or from said raised filling position into said flat closed position;

wherein said at least one driving pivoting device (53) comprises at least one pivot mechanism (54, 55), said at least one pivot mechanism includes a plurality of pivot axles (60, 61, 80, 81), raising levers (58, 79) attached to the pivot axles (60, 61, 80, 81), pendulum supports (57, 78), said pendulum supports being connected with the extension elements (37, 38, 39, 40) and with the raising levers;

at least one coupling rod (69, 84) connecting the pivot axles (60, 61, 80, 81) with each other; and at least one positioning member (74, 89) for rotating or pivoting the pivot axles (60, 61, 80, 81), which are connected with each other by the at least one coupling rod (69, 84);

wherein said at least one positioning member (74, 89) comprises two double-acting hydraulic cylinders (73, 88) that are acted on with equal pressures when said extension elements are pivoted;

wherein said hydraulic cylinders (73, 88) have respective piston rods (75, 90) and said piston rods (75, 90) move in directions opposite to each other when said extension elements are pivoted.

2. The device as defined in claim 1, wherein said extension elements form a kinematic linkage (52).

3. The device as defined in claim 1, wherein said at least one positioning member (74, 89) is located outside of the container (24).

4. The device as defined in claim 1, wherein said hydraulic cylinders (73, 88) have respective piston rods (75, 90) and said piston rods (75, 90) move simultaneously and with approximately equal speeds when said extension elements are pivoted.

5. A device for increasing a volume or capacity of a container, said container (24) being provided with an upper opening (32) having an upper edge (31), wherein said device comprises a plurality of extension elements (37, 38, 39, 40) pivotally mounted on the upper edge (31) of the upper opening (32) so as to form a cover at least partially closing the upper opening (32) when the extension elements (37, 38, 39, 40) are in flat closed positions and an enlarging extension (27) for the container when the extension elements are in raised filling positions, and wherein neighboring ones of said extension elements are pivotally connected with each other, said enlarging extension (27) comprising two opposing one-piece elements (37, 38) and two opposing multi-piece elements (39, 40), said multi-piece elements (39, 40) each comprising two folding triangular elements (42) and a trapezoidal-shaped center element (43) arranged between the triangular elements (42), and wherein the folding triangular elements (42) are pivotally connected with the center element (43) by respective hinges (44);

a first pivot mechanism (55) configured to pivot said two opposing one-piece elements (37, 38) into nearly vertical positions from the flat closed positions or out from the raised filling positions toward the flat closed positions;

a second pivot mechanism (54) configured to pivot said two opposing multi-piece elements (39, 40), at the same time or after said two opposing one-piece elements (37,38) are pivoted into said nearly vertical positions, into the raised filling positions beyond vertical positions thereof and into second angular orientations at second angles (97) in relation to said vertical positions thereof, whereby said two opposing one-piece elements (37,38), which are pivotally connected with said multi-piece elements (39,40), are pivoted further from said nearly vertical positions into first angular orientations at first angles (98) in relation to said nearly vertical positions;

wherein said first pivot mechanism (55) includes respective first pivot axles (80, 81) associated with said opposing one-piece elements (37,38) and a first positioning member (89) connected with the first pivot axles in order to rotate the first pivot axles and wherein said second pivot mechanism (54) includes respective second pivot axles (60, 61) associated with the multi-piece elements (39,40) and a second positioning member (74) connected with the second pivot axles in order to rotate the second pivot axles; and wherein said first positioning member (89) and said second positioning member (74) are respective double-acting hydraulic cylinders (88, 73) and said respective double-acting hydraulic cylinders (88, 73) have corresponding piston rods (90, 75) that move in directions opposite to each other when said extension elements are pivoted into the raised filling positions or into the flat closed positions;

whereby the first pivot mechanism (55) and the second pivot mechanism (54) do not hinder each other when the extension elements are pivoted into the raised filling positions or into the flat closed positions.

6. The device as defined in claim 5, wherein said hydraulic cylinders are acted on with equal pressures when said extension elements are pivoted.

7. The device as defined in claim 5, wherein said first pivoting mechanism comprises first raising levers (79) attached to the respective first pivot axles (80, 81), first pendulum supports (78) pivotally connecting the opposing one-piece elements (37, 38) and the raising levers (79), and a first coupling rod (84) pivotally connecting the first pivot axles with each other and said second positioning member comprises second raising levers (58) attached to the second pivot axles (60, 61), second pendulum supports (57) pivotally connecting the extension elements (39, 40) and the second raising levers, and a second coupling rod (69) pivotally connecting the second pivot axles (60,61).

8. The device as defined in claim 5, wherein said double-acting hydraulic cylinders (88, 73) are located outside of the container (24).

9. The device as defined in claim 5, wherein said first pivot mechanism (55) is configured so that a first spacing (102) between one (90) of said piston rods (90,75) and one (81) of said first pivot axles (80, 81) and a torque applied to pivot the one-piece elements (37, 38) by the first pivot mechanism (55) increase during pivoting of the one-piece elements from the raised filling positions to the flat closed positions and said second pivot mechanism (54) is configured so that a second spacing (101) between another one (75) of said piston rods (90, 75) and one (60) of said first pivot axles (60, 61) and a torque applied to pivot the multi-piece elements (39, 40) by the second pivot mechanism (54) decrease during pivoting of the multi-piece elements from the raised filling positions to the flat closed positions.

* * * * *